(12) United States Patent
Manzano

(10) Patent No.: US 7,523,456 B2
(45) Date of Patent: Apr. 21, 2009

(54) SYSTEM AND METHOD FOR ADDING LOCAL RESOURCES FOR USE BY A MOBILE AGENT OBJECT

(75) Inventor: Michael R. Manzano, Seattle, WA (US)

(73) Assignee: Topia Technology, Inc., Tacoma, WA (US)

( * ) Notice: Subject to any disclaimer, the term of this patent is extended or adjusted under 35 U.S.C. 154(b) by 825 days.

(21) Appl. No.: 10/627,203

(22) Filed: Jul. 25, 2003

(65) Prior Publication Data

US 2004/0210910 A1 Oct. 21, 2004

Related U.S. Application Data

(60) Provisional application No. 60/398,888, filed on Jul. 26, 2002.

(51) Int. Cl.
*G06F 3/00* (2006.01)
*G06F 9/44* (2006.01)

(52) U.S. Cl. ..................... 719/310; 717/171

(58) Field of Classification Search ............... 719/317, 719/310; 709/202; 717/171
See application file for complete search history.

(56) References Cited

U.S. PATENT DOCUMENTS

| | | | | |
|---|---|---|---|---|
| 6,981,251 | B1* | 12/2005 | Kreller et al. | 717/171 |
| 7,016,966 | B1* | 3/2006 | Saulpaugh et al. | 709/230 |
| 7,092,986 | B2* | 8/2006 | Wang | 709/202 |
| 2001/0029526 | A1* | 10/2001 | Yokoyama et al. | 709/218 |
| 2002/0156932 | A1* | 10/2002 | Schneiderman | 709/317 |

OTHER PUBLICATIONS

META Group; Loose Leaf Manual; Mobile Agent Technology and Market Positioning; Feb. 2001; pp. 2-31.

* cited by examiner

*Primary Examiner*—Meng-Ai An
*Assistant Examiner*—Lechi Truong
(74) *Attorney, Agent, or Firm*—P. G. Scott Born; Black Lowe & Graham PLLC

(57) ABSTRACT

System and method for importing service objects to a host computing environment. In one embodiment, a method includes the steps of executing a mobile agent object, (called a delivery-mobile agent object) in a mobile-agent runtime environment in a host computing environment and then installing a service object to be executable in the mobile-agent runtime environment.

11 Claims, 4 Drawing Sheets

SYSTEM AND METHOD FOR ADDING LOCAL RESOURCES FOR USE BY A MOBILE AGENT OBJECT

CROSS REFERENCE TO RELATED APPLICATION

This application claims the benefit of Provisional Patent Application Ser. No. 60/398,888 filed Jul. 26, 2002 entitled "Adding Local Resources for use by Mobile Agents."

TECHNICAL FIELD OF THE INVENTION

The present invention relates, generally, to a distributed computing environment wherein processes created in an object-oriented environment direct their own movement throughout a computer network, and, in particular, relates to the adding of local resources within host-computing environments for use by mobile agents running therein.

BACKGROUND OF THE INVENTION

The advent of computer networks has proliferated the use of distributed-computing environments. A distributed-computing environment is a type of computing wherein several computer platforms, i.e., different computers, coupled by a network, perform separate but related tasks, (called a process), that are directed in concert toward a single achievement. One example of such a process is the retrieval of all files in a network having the same pattern of letters in the file name. By taking advantage of the computing power of several computers at once, tasks require less time for completion. Use of a processor close to resources to be processed reduces total computing resource requirements.

One method known in the art for practicing a distributed-computing environment is called "remote programming." In remote programming, a first executing program, called a client process, executing on a first computer system, sends to a second process, called a server process executing on the second computer system, a list of instructions. The instructions are then carried out on the second computer system by the server process, effectuating the goal of the client process. The instructions that the server process is designed to carry out must have some degree of generality, i.e., the instructions must allow some degree of local decision-making with respect to details.

U.S. Pat. No. 6,016,393 to White et al., entitled, "System and Method for Distributed Computation Based upon the Movement, Execution, and Interaction of Processes in a Network", which is hereby incorporated by reference, disclosed a system that improved upon the concept of remote programming by utilizing processes called mobile agents (sometimes referred to as mobile objects or agent objects). The system described by White et al., provides the ability for an object (the mobile agent object), existing on a first ("host") computer system, to transplant itself to a second ("remote host") computer system while preserving its current execution state. The operation of a mobile agent object is described briefly below.

The instructions of the mobile agent object, its preserved execution state, and other objects owned by the mobile agent object are packaged, or "encoded", to generate a string of data that is configured so that the string of data can be transported by all standard means of communication over a computer network. Once transported to the remote host, the string of data is decoded to generate a computer process, still called the mobile agent object, within the remote host system. The decoded mobile agent object includes those objects encoded as described above and remains in its preserved execution state. The remote host computer system resumes execution of the mobile agent object which is now operating in the remote host environment.

While now operating in the new environment, the instructions of the mobile agent object are executed by the remote host to perform operations of any complexity, including defining, creating, and manipulating data objects and interacting with other remote host computer objects. These interactions may be handled through processes called services. A typical mobile agent object may discover and use services and log the calls to and usage of such services. A system and method directed to the discovery and monitoring of services is disclosed in co-pending U.S. patent application Ser. No. 10/617,604, entitled "SYSTEM AND METHOD FOR THE DISCOVERY OF AND USAGE OF LOCAL RESOURCES BY A MOBILE AGENT OBJECT," filed on Jul. 11, 2003, which is assigned to Topia Ventures LLC and which is incorporated by reference.

When a mobile agent object is operating in a remote host environment, specific services may be needed but not available within the area of execution of the mobile-agent object called the mobile-agent runtime environment. In such a case, the mobile agent object may be programmed to skip over attempting to use the particular service. In other cases, the mobile agent object may not be programmed with the capacity to determine whether the service is available, thus causing delays and possibly even irretrievable loops. Still other mobile agent objects may be programmed to request the delivery of the service from the original host system for use in the new mobile agent runtime environment.

If the service is requested from the original host system, the purpose of the mobile agent object is defeated in that the mobile agent object is intended to be implanted in a remote host computing environment to eliminate unnecessary communications over the network when data and information are required from the host computing environment. Since the mobile agent object needs to request a service object to be delivered from its original host computing environment to be used in the new mobile-agent runtime environment in the host computer system, communication over the network still occurs and there is no time and computing efficiency realized over the situation where the original host requests the needed data and information directly without using the mobile agent object.

Therefore, a method and system for adding needed services by taking advantage of the mobile agent mechanism wherein communication over the network is minimized is desirable.

SUMMARY OF THE INVENTION

According to an embodiment of the invention, a system and method is presented for a mobile agent runtime environment to dynamically extend its capabilities. More specifically, the capabilities of a particular mobile-agent runtime environment are extended by the delivery, via a mobile agent object, of needed service modules that originate from a remote source. In one embodiment of the invention, a method includes the steps of executing a mobile agent object, (called a delivery-mobile agent object) in a mobile-agent runtime environment in a host computing environment and then installing a service object to be executable in the mobile-agent runtime environment.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
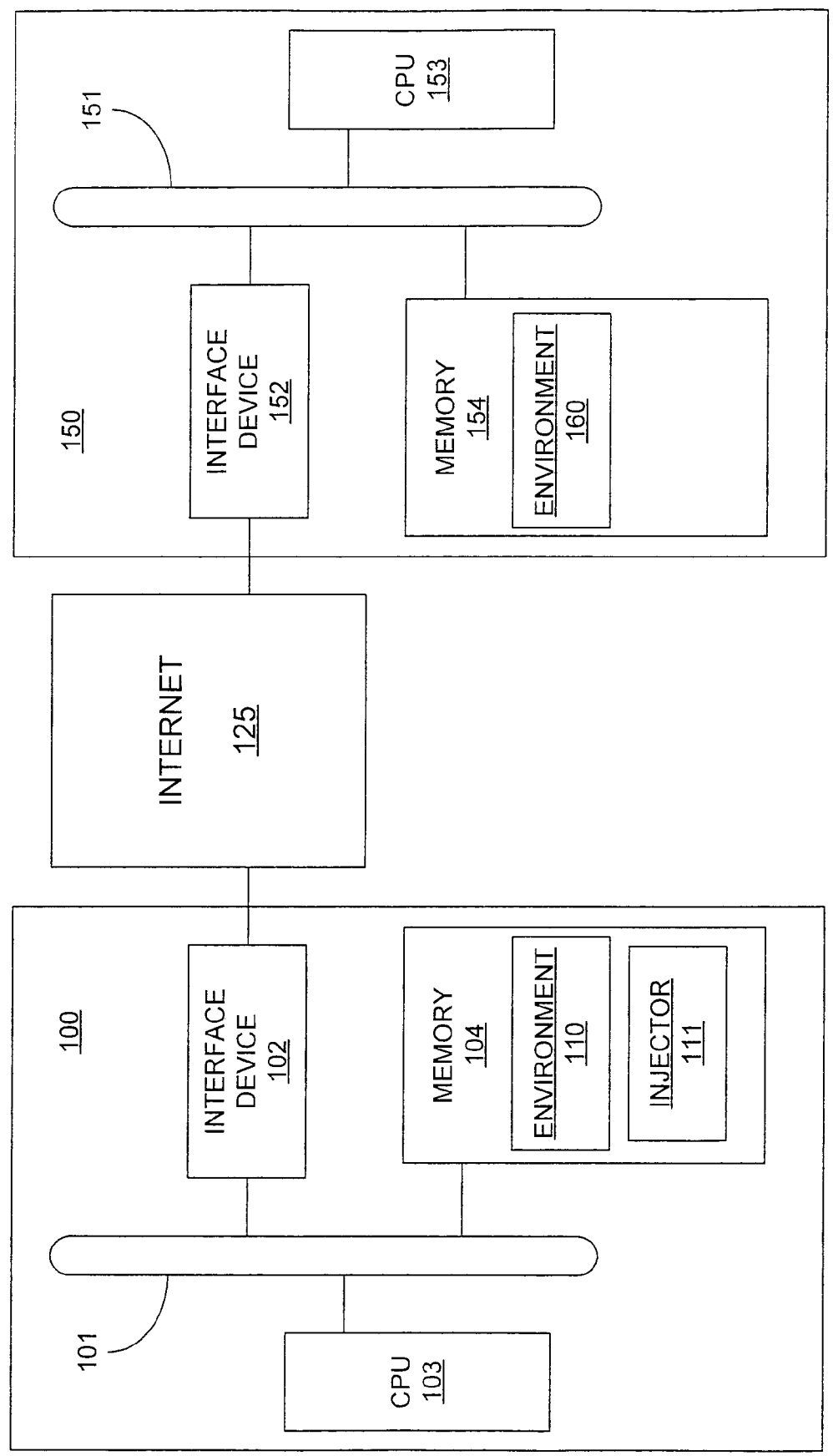
FIG. 1 is a block diagram of one embodiment of a distributed-computing environment suitable for practicing embodiments of the invention.

FIG. 1 is a block diagram of a distributed-computing environment suitable for practicing embodiments of the invention. The distributed-computing environment includes a first computer system 100 (original host) and a second computer system 150 (remote host) that are coupled by a network connection, such as the internet 125 as shown in FIG. 1. The network connection may be any other connection, such as a Local Area Network (LAN) for example, that is suitable for facilitating communication between computer systems. Here, the first 100 and second 150 computer systems may communicate over the internet 125 using a standard protocol, such as, for example, Transmission Control Protocol/Internet Protocol (TCP/IP). Additionally, there are typically many more computer systems (not shown) coupled with the internet 125, all of which may communicate with other computers on the network including the first and second computers 100 and 150.

The original host 100 includes a CPU 103 coupled to a bus 101 that facilitates communication between the CPU 103 and other components of the original host 100. Other components of the original host 100 include a Network Interface Component 102 (NIC) and a memory 104. The memory may include magnetic or optical disks, Random-Access memory (RAM), Read-Only memory (ROM), Basic Input/Output Systems (BIOS), or any other commonly known memory system used in computer architecture. In the original host 100, a mobile-agent runtime environment 110 and a mobile-agent injector program 111 are resident within the memory 104. Although shown as separate memory components, the mobile-agent runtime environment 110 and a mobile-agent injector program 111 may reside in a single memory component or in any combination of memory components that are coupled with the bus 101. The NIC 102 facilitates communications between the original host 100 and other computers, such as the remote host 150, via the internet 125.

The remote host 150 is similar to the original host 100 and includes a CPU 153, a bus 151, a NIC 152, and a host platform memory 154 which includes a mobile-agent runtime environment 160. These components are organized and coupled as described above with respect to the original host 100.

The above-described distributed-computing environment may host one or more mobile agent objects (not shown) that are present in one of the mobile-agent runtime environments 110 or 160 of one of the computers 100 or 150. The mobile-agent runtime environment 110 and 160 is a portion of the memory dedicated to allowing a mobile agent object the ability to perform operations that it was programmed to carry out. The nature of the mobile agent object, the manner in which the mobile agent object is transported between computers, and the parameters of the mobile agent object's abilities are discussed in detail in White et al. (which has been incorporated by reference) and will not be discussed further herein.

Mobile agent objects may be instantiated in a mobile-agent runtime environment 110 or 160 in several ways, two of which are briefly described here. In a first way, the mobile agent object is locally created in the original host 100 and then locally injected into the mobile-agent runtime environment 110 by the mobile-agent injector program 111. In a second way, the mobile agent object moves from the mobile-agent runtime environment 110 of the original host 100 to the mobile-agent runtime environment 160 of the remote host 150 over the internet 125 by its own accord, i.e., according to its programmed instructions. Both of these instantiation processes are well known in the prior art.

Figure 2:
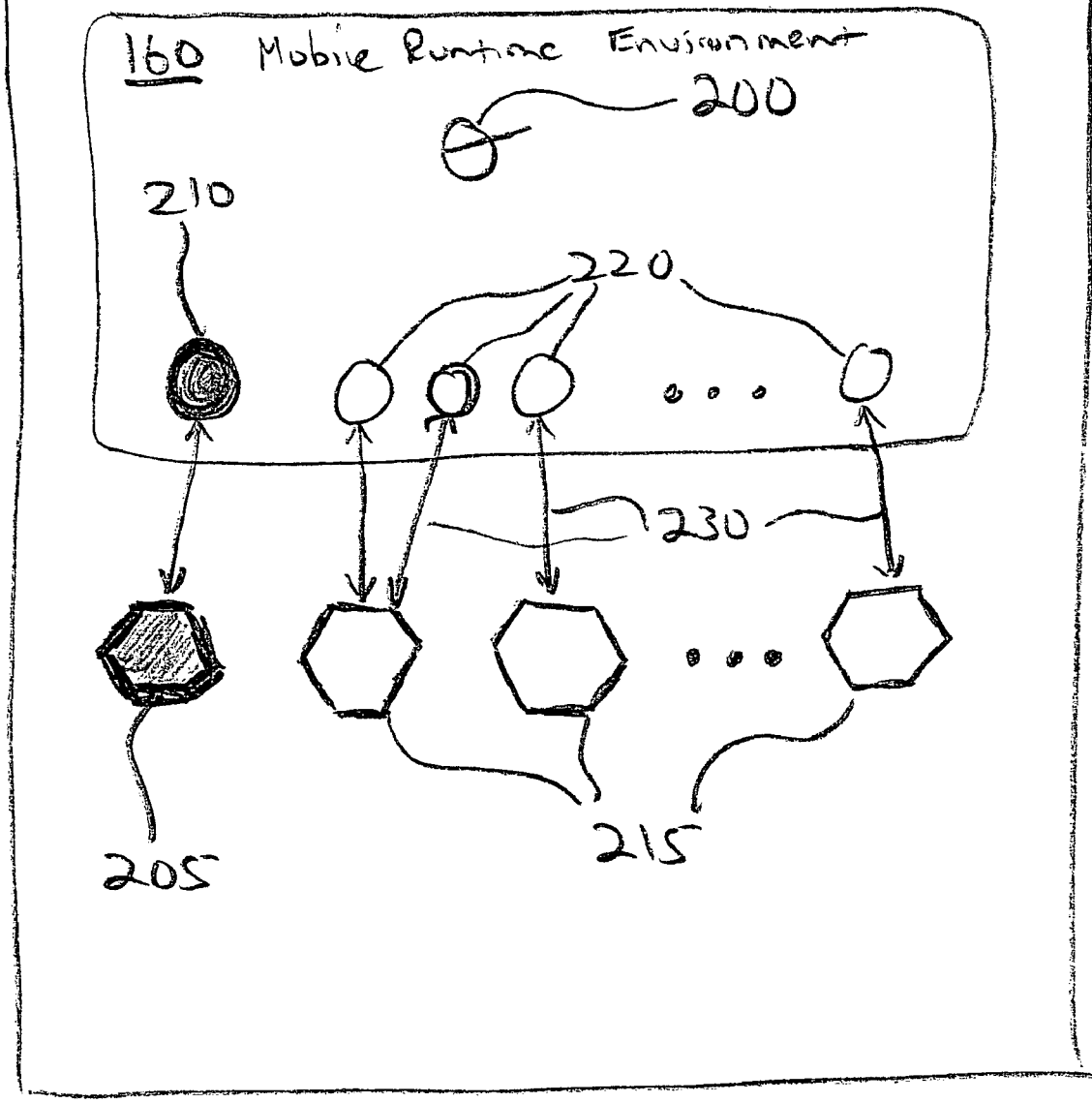
FIG. 2 is a block diagram of a host platform memory having a mobile-agent runtime environment residing therein according to an embodiment of the invention.

FIG. 2 is a block diagram of a host platform memory 154 having a mobile-agent runtime environment 160 residing therein according to an embodiment of the invention. In the host platform memory 154, a method and system may be provided that enables a mobile agent runtime environment 160 with the ability to dynamically extend its capabilities. Specifically, capabilities are extended by the delivery, via a specific mobile agent object called a delivery mobile agent object 200, of service modules 220 from a remote source, i.e., the original host 110.

When a delivery mobile agent object 200 is instantiated in a new environment, such as the mobile-agent runtime environment 160 of the host platform memory, the delivery mobile agent object may be programmed to discover the services that are available in the mobile-agent runtime environment 160 in order to determine what service objects 220 are available. The discovery of service objects is described in co-pending U.S. patent application Ser. No. 10/617,604, entitled "SYSTEM AND METHOD FOR THE DISCOVERY OF AND USAGE OF LOCAL RESOURCES BY A MOBILE AGENT OBJECT," mentioned above. By discovering services that are available, the delivery-mobile-agent object may determine what service objects do not exist in the mobile-agent runtime environment 160. As such, the delivery mobile agent object 200 may then install the needed service objects 220 in the mobile-agent runtime environment 160.

In an alternative embodiment, the delivery mobile agent object 200 is programmed to install one or more specific service objects 220 without having to discover the current service objects 220 in the mobile-agent runtime environment 160. This may be the case because a different mobile agent object (not shown) previously discovered the service objects 220 that are available and then relaying this information for the programming of the delivery-mobile-agent-object 200.

Still referring to FIG. 2, the mobile-agent runtime environment 160 is provided within the host platform memory 154 wherein a delivery-mobile-agent-object 200 may execute its instructions. As described above, the host platform memory 154 resides within a host computing environment on the remote host 150 accessible via the network (Internet 125 of FIG. 1) by the sender of the delivery-mobile-agent-object 200, i.e., the original host 100. The mobile-agent runtime environment 160 also includes a number of service objects 220 that export an application programming interface (API) which are not shown in FIG. 2. Each API provides a communication channel to the CPU 153 of the remote host 150 that enables each service object 220 the computing capabilities for performing its particular operations. Each service object 220 is also associated, through a binding relationship 230, with a one or more related service modules 215 that realize the functionality of one or more service objects 220. Each service object 220 may have more than one binding relationship 230 with a plurality of service modules 215, and each service module 215 may have more than one binding relationship 230 with several service objects 220. Service objects 220 and service modules 215 act in conjunction to carry out operations when its service is requested by any process or object, such as delivery mobile agent object 200.

For example, a particular service object 220 may be called by any number of processes or objects, such as the delivery-mobile-agent-object 200. When called, the service object 220 initiates a CPU 153 request on its dedicated API. The CPU 153 handles all API traffic according to a known timing protocol. As such, when the CPU 153 decides that this particular API of the service object 220 is to be granted permission for execution, the CPU 153 carries out the instructions associated with the service object 220 which may be, for example, to list all service objects 220 available within the mobile-agent runtime environment 160.

One particular type of service object 220 is called a service delivery service object 210. A service-delivery service object 210 is a realization of a service object 220 which defines an API that allows the delivery-mobile-agent-object 200 the ability to install, remove, and verify both service objects 220 and service modules 215. Furthermore, the service-delivery service object 210 exports one or more APIs that allow the delivery-mobile-agent-object 200 the ability to create binding relationships 230 between a particular kind of service module 215, called a service-delivery service module 205, and the service-delivery service object 210. The service-delivery service module 205 is a realization of a service module 215 that implements the functionality of the service-delivery service object 210. The operation and interaction between the above-described objects and components is described in greater detail below with respect to FIG. 4.

Figure 3:
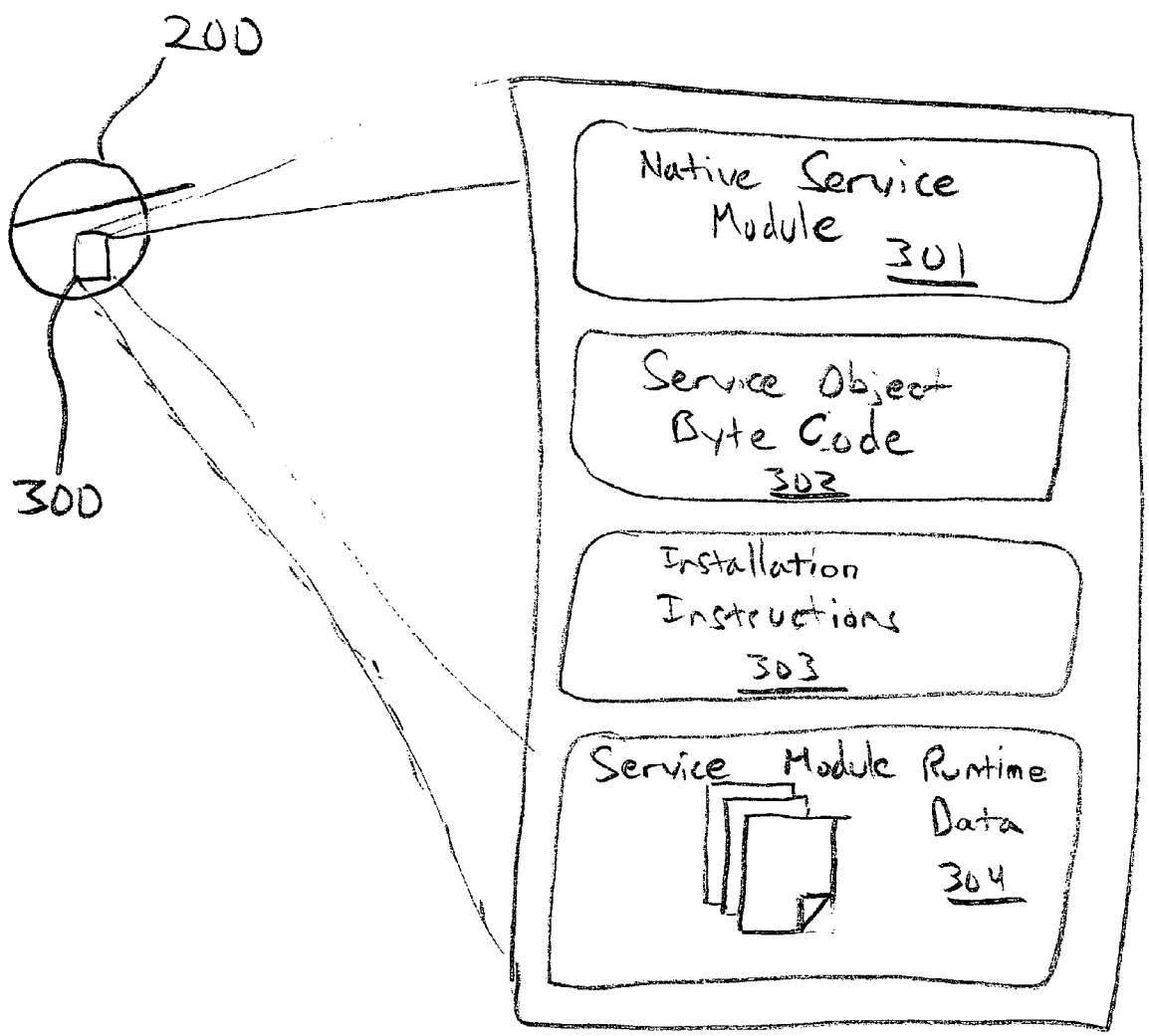
FIG. 3 is a block diagram delivery of a mobile agent object according to an embodiment of the invention.

FIG. 3 is an exploded view of a block diagram of a delivery-mobile-agent-object 200 according to an embodiment of the invention. The delivery-mobile-agent-object 200 includes programmable instructions directed to the functions associated with the delivery-mobile-agent-object 200. Specifically, the delivery-mobile-agent-object 200 includes a native-service module 301, service-object byte code 302, installation instructions 303, and service-module runtime data 304. These components facilitate the functions of a delivery-mobile-agent-object 200.

The native-service module 301 is a realization of a service module 215 that is incorporated within the delivery-mobile-agent-object 200 and that implements an API (not shown) as defined by the related service-object byte code 302 contained within the delivery-mobile-agent-object 200. The native-service module 301 contains code that executes in the host platform memory (154 in FIG. 1) and may be compressed while resident in the delivery-mobile-agent-object 200. When a delivery-mobile-agent-object 200 is first instantiated in a mobile-agent runtime environment 160, the native-service module 301 is executed in the host platform memory 154 and, as such, becomes "native" to the mobile-agent runtime environment 160 that is within the host platform memory 154.

The service-object byte code 302 is a realization of a service object 220 that is incorporated within the delivery-mobile-agent-object 200 and that defines an API whose implementation is intended to extend the functionality of the mobile-agent runtime environment 160 where the delivery-mobile-agent-object 200 is currently executing. The service-object byte code 302 is operable to create binding relationships (not shown) between service objects 220 and service modules 215 that are stored in the native-service module 301.

The installation instructions 303 are a set of instructions integral to the delivery-mobile-agent-object 200 which direct the service delivery service object 210 to carry out the installation of its service objects 220 and service modules 215.

The service-module runtime data 304 is used by the native-service module 301 during runtime. The data contained in the service-module runtime data 304 is dependent upon the intent and implementation of the native-service module 301. That is, the service-module runtime data is directly related to the service objects 220 that are stored for installation in the native-service module 301. The installation method is described further below with respect to FIG. 4.

Figure 4:
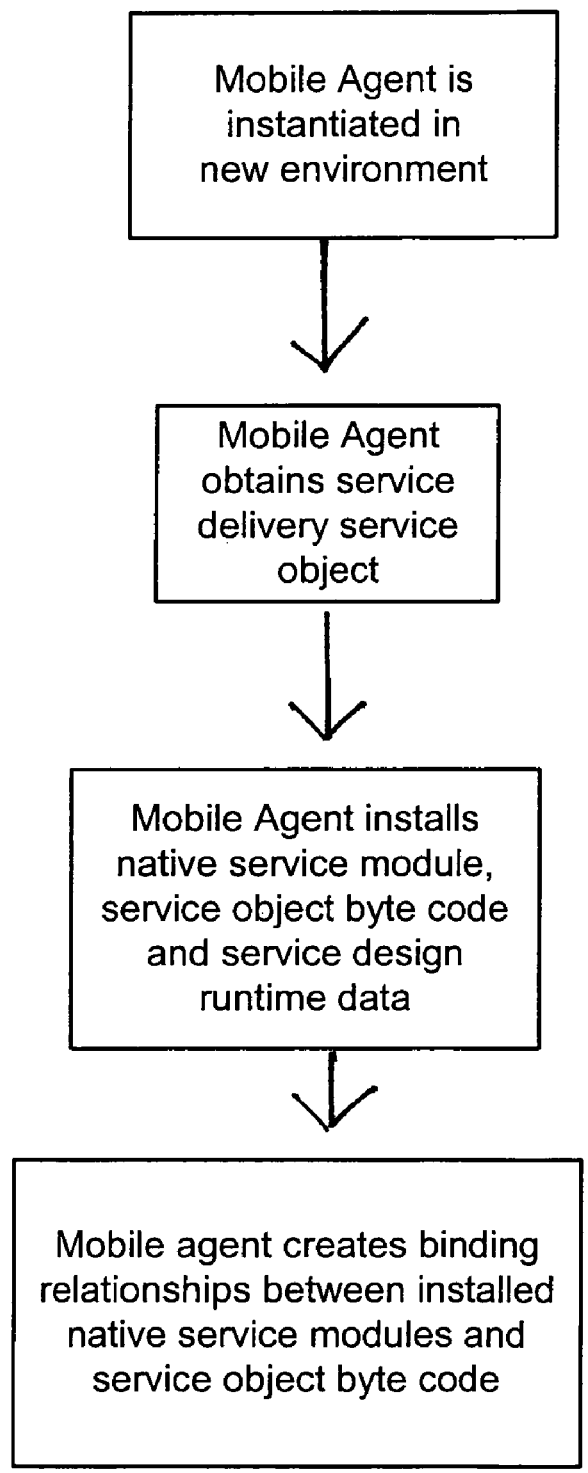
FIG. 4 is a flow diagram of a method for delivering services from a remote computing environment to a host computing environment through use of a delivery mobile agent object according to an embodiment of the invention.

FIG. 4 is a flow diagram of a method for delivering services from a host computing environment 100 to a remote host computing environment 150 through use of one or more delivery-mobile-agent-objects 200 according to an embodiment of the invention. At step 401, a delivery-mobile-agent-object 200 in instantiated (discussed previously) in a mobile-agent runtime environment 160 that is resident within a host platform memory 154. The delivery-mobile-agent-object 200 already includes a number of service objects 220 and service modules 215 that are to be installed. The service objects 220 and service modules 215 are stored within the service-object byte code 302 and the native-service module 301, respectively, prior to installation.

Next, the delivery-mobile agent object 200 obtains the service-delivery service object 210 at step 403. The delivery-mobile-agent-object 200, already resident in the mobile-agent runtime environment 160, obtains the service-delivery service object 210 in order to gain the use of an API to utilize the CPU 153 of the host system 150.

Next, at step 405, the delivery-mobile-agent-object uses the API of the service-delivery service object 210 to install its native-service module 301, its service-object byte code 302, and its service-module runtime data 304 into the mobile-agent runtime environment 154 according to the computer-executable instructions included in the installation instructions 303.

Next, at step 407, the delivery-mobile agent object 200 uses the API of the service-delivery service object 210 to create binding relationships 230 to map the installed native service module 301 to the associated service object byte code 302. That is, the newly installed service objects 220 that came from the service-object byte code 302 and the newly installed service modules 215 that came from the native-service module 301 are mapped with various binding relationships according to the installation instructions. Finally, at step 409, the delivery-mobile agent object 200 may be ejected from the mobile-agent runtime environment 154, thus, completing the installation method. Now, the newly installed service object may be called by any process or object that is executing in the mobile-agent runtime environment.

The preceding discussion is presented to enable a person skilled in the art to make and use the invention. The general principles described herein may be applied to embodiments and applications other than those detailed above without departing from the spirit and scope of the present invention.

The present invention is not intended to be limited to the embodiments shown, but is to be accorded the widest scope consistent with the principles and features disclosed or suggested herein.

I claim:

1. A method implemented by at least one computer, wherein the at least one computer performs steps of the method comprising:

executing a first mobile agent object in a first mobile-agent runtime environment in a first host computing environment, the first mobile agent object operable to execute in a first electronic device, halt execution in the first electronic device at an execution state, be transplanted to a second electronic device, and resume execution from the execution state in the second electronic device;

configuring the first mobile agent object to install a service object executable in the first mobile-agent runtime environment, wherein the first mobile agent object enables the use of an API associated with the first host computing environment; and generating in the first host computing environment a second mobile-agent object operable to navigate to a second host computing environment, discover available services associated with the second host computing environment, and provide to the first host computing environment information associated with the available services.

2. A method implemented by at least one computer, wherein the at least one computer performs steps of the method, comprising:

accessing, with a first host computing environment, a second host computing environment having a mobile-agent runtime environment;

generating in the first host computing environment a first mobile-agent object operable to navigate to the second host computing environment and install a service object executable in the mobile-agent runtime environment and that may be called by any process or subsequent mobile-agent object that is executing in the mobile-agent runtime environment, the mobile agent object operable to execute in a first electronic device, halt execution in the first host computing environment at an execution state, be transplanted to a second host computing environment, and resume execution from the execution state in the second host computing environment, wherein the first mobile agent object enables the use of an API associated with the second host computing environment;

generating in the first host computing environment a second mobile-agent object operable to navigate to the second host computing environment, discover available services associated with the mobile-agent runtime environment, and provide to the first host computing environment information associated with the available services.

3. The method of claim 2 wherein the first mobile-agent object is further operable to discover available services associated with the mobile-agent runtime environment.

4. The method of claim 2 wherein the first mobile-agent object includes the service object.

5. The method of claim 2 wherein the first mobile-agent object includes at least one service module operable to realize a function of the service object.

6. A computer-readable storage medium having stored thereon a data structure, comprising:

a first instruction set that when executed by a computing device causes the data structure to navigate from a first host computing environment to a second host computing environment having a mobile-agent runtime environment;

a second instruction set that when executed by the computing device causes the installation of a service object executable in the mobile-agent runtime environment and that may be called by any process or subsequent mobile-agent object that is executing in the mobile-agent runtime environment;

a thirst instruction set that when executed by the computing device causes discovery of available services associated with the mobile-agent runtime environment, and provision to the first host computing environment information associated with available services; and a fourth instruction set that when executed enables the use of an API associated with the second host computing environment.

7. The medium of claim 6 wherein the data structure further comprises at least one service module operable to realize a function of the service object and executable in the mobile-agent runtime environment.

8. The medium of claim 7 wherein the second instruction set, when executed, further causes the installation of the at least one service module in the mobile-agent runtime environment.

9. The medium of claim 6 wherein the data structure further comprises the service object.

10. The medium of claim 6 wherein the data structure further comprises a runtime-data set associated with the service object.

11. A computer-readable storage medium having stored thereon instructions that when executed by a computing device perform the method of claim 2.

* * * * *